United States Patent [19]
Wasserman et al.

[11] Patent Number: 5,743,842
[45] Date of Patent: Apr. 28, 1998

[54] METHOD FOR ENCAPSULATING AND ISOLATING HAZARDOUS CATIONS, MEDIUM FOR ENCAPSULATING AND ISOLATING HAZARDOUS CATIONS

[75] Inventors: Stephen R. Wasserman, Darien; Kenneth B. Anderson, Lisle; Kang Song, Woodridge; Steven E. Yuchs; Christopher L. Marshall, both of Naperville, all of Ill.

[73] Assignee: The United States of America as represented by the United States Department of Energy, Washington, D.C.

[21] Appl. No.: 635,437

[22] Filed: Apr. 11, 1996

[51] Int. Cl.⁶ .................... A62D 3/00; B09B 3/00
[52] U.S. Cl. ............... 588/256; 502/901; 588/249; 588/901
[58] Field of Search ............... 588/13, 19, 249, 588/256, 259, 901; 405/128; 502/521

[56] References Cited

U.S. PATENT DOCUMENTS

| | | | |
|---|---|---|---|
| 4,149,968 | 4/1979 | Kuplec et al. | 405/128 X |
| 4,319,983 | 3/1982 | Yoo | 502/521 X |
| 4,348,273 | 9/1982 | Nielsen | 405/128 X |
| 4,376,792 | 3/1983 | Angelini et al. | 588/13 |
| 4,565,577 | 1/1986 | Burkhardt et al. | 106/900 X |
| 4,701,219 | 10/1987 | Bonee | 588/256 |
| 5,157,006 | 10/1992 | Harris et al. | 502/521 X |
| 5,234,498 | 8/1993 | Graves, Jr. | 588/256 X |
| 5,298,166 | 3/1994 | Bray et al. | 588/13 X |
| 5,372,729 | 12/1994 | Hooykaas | 588/256 X |
| 5,582,572 | 12/1996 | Bianchi | 588/252 |

OTHER PUBLICATIONS

Abstract — Stephen R. Wasserman and Kang Song — The Encapsulation of Hazardous Ions in Smectite Clays, published at SERDP Symposium, Washington, D.C., Apr. 13, 1995.

Primary Examiner—George A. Suchfield
Attorney, Agent, or Firm—Joy Alwan; Thomas G. Anderson; William R. Moser

[57] ABSTRACT

A method for encapsulating hazardous cations is provided comprising supplying a pretreated substrate containing the cations; contacting the substrate with an organo-silane compound to form a coating on the substrate; and allowing the coating to cure. A medium for containing hazardous cations is also provided, comprising a substrate having ion-exchange capacity and a silane-containing coating on the substrate.

14 Claims, 3 Drawing Sheets

METHOD FOR ENCAPSULATING AND ISOLATING HAZARDOUS CATIONS, MEDIUM FOR ENCAPSULATING AND ISOLATING HAZARDOUS CATIONS

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

1. Field of the Invention

This invention relates to a method for encapsulating and isolating toxic metals, and more specifically this invention relates to a medium for containing toxic cations and a method for reducing the leachability of toxic cations from cation storage media and from substrates containing toxic cations.

2. Background of the Invention

The problems associated with the disposal of toxic metals in an environmentally acceptable manner continues to plague industry. Such metals as nickel, vanadium, molybdenum, cobalt, iron, and antimony present physiological and ecological challenges that are best addressed through minimization of exposure and dispersion.

Unfortunately, materials tainted with toxic metals are produced in great quantities. For example, thousands of tons of spent fluid cracking catalysts (FCC) used in petroleum refining are produced each year, containing large quantities of nickel and vanadium as a result of exposure to crude oil. Yet another potentially hazardous metal, antimony, is added to the catalyst to counteract the effect of nickel in the cracking process. Current methods for disposing of spent FCC include using some of the catalyst in cement manufacturing and land-filling the rest. However, leaching of the cations from the land-filled catalyst presents aquifer contamination problems.

Other industrial processes also produce waste-streams laden with heavy metals. These processes include the hardening of steel (vanadium required), lead alloy and battery manufacture processes (antimony involved), and pigment production (cobalt). As a final step in many of these processes, waste streams are directed to water treatment systems, leading to high concentrations of heavy metals in resulting sludge.

Various attempts have been made to isolate hazardous materials in leach-proof containers. For example, U.S. Pat. No. 4,149,968 to Kupiec et al., discloses a method for mixing clays and concretes with aqueous mixtures of pollutants to produce a solid mass. However, that process requires cement, which, while not expensive, is a man-made material having certain production costs associated with it. Also, the process mainly relies on physical encapsulation of the hazardous materials while not providing a hydrophobic barrier between the encapsulated materials and the environment.

U.S. Pat. No. 4,565,577 to Burkhardt, et al. discloses compositions containing clay, cement, fillers and silane materials for use as liners in landfill operations. However, this process does not provide a system to stabilize and therefore isolate hazardous cations.

A need exists in the art for an economic method for encapsulating heavy metals so as to minimize their leaching into the environment. Such a method should utilize easily obtainable materials as encapsulating substrates. The method also should be performed at near ambient temperatures and pressures. A need also exists for an encapsulation structure or medium comprising low-cost materials.

SUMMARY OF THE INVENTION

It is an object of the present invention to provide a method for encapsulating cations which overcomes many of the disadvantages of the prior art.

Another object of the present invention is to provide a method for isolating cations from the environment. A feature of the invention is the use of silane compounds to coat ion-exchange substrates which contain the cations. An advantage of the invention is that the coating is hydrophobic and therefore isolates the cations from aqueous liquid interactions and interactions with environmental fluids, e.g. ground water.

Still another object of the present invention is to provide a method for encapsulating hazardous cations contained in substrates. A feature of the invention is stabilizing the cations in the substrate without having to remove the cations from the substrate. An advantage of the invention is minimizing exposure of adjacent structures and the environment to the cations.

Yet another object of the invented method is to provide a method for encapsulating cations in ubiquitous substrates. A feature of the method is to insert the cations into the substrates, such as clay and petroleum refining catalysts, and then to physically and chemically stabilize and immobilize the cations. An advantage of the method is the low cost associated with the use of ubiquitous substrates to encapsulate hazardous materials.

Still another object of the present invention is to provide a medium for encapsulating and isolating hazardous cations. A feature of the invention is the use of ubiquitous substrates, such as clay, or substrates which are secondary waste stream materials, such as petroleum refining catalysts, to construct the medium. An advantage of the invention is minimization of exposure to hazardous cations and a concomitant decrease in bulk disposal problems associated with the ubiquitous or secondary waste stream substrates.

Briefly, the invention provides for a method for encapsulating hazardous cations comprising supplying a pretreated substrate containing the cations and then contacting the substrate with a silane compound to form a coating on the substrate.

The invention also provides for a medium to encapsulate and isolate hazardous cations comprising a substrate having an ion-exchange capacity to accommodate the cations and a silane-containing coating on the substrate.

BRIEF DESCRIPTION OF THE DRAWING

These and other objects and advantages of the present invention will become readily apparent upon consideration of the following detailed description and attached drawing, wherein.

DETAILED DESCRIPTION OF THE INVENTION

This invention provides a method to reduce the leachability of toxic metals into the environment. In one embodiment of the invention, a method is provided to keep cations, first placed into an ion-exchange substrate from leaching out of the substrate. Such a substrate is selected from the group consisting of alumino-silicate materials (e.g. clay and zeolites) and petroleum refining catalysts. In another embodiment of the invention, a method is provided to reduce the leachability of toxic metals already contained in substrates such as spent petroleum cracking catalysts. This second embodiment serves to minimize exposure to cations that otherwise occurs in typical methods where cations are first harvested from contaminated substrate and then subsequently treated.

Both embodiments rely on treating the cation-containing substrates with an alkyl-silane material. This silane treatment causes covalent linking between the silane, water, and surface hydroxyls on the surface of the substrates, resulting in a hydrophobic coating being formed on the substrate. It is this coating that isolates the cations from an aqueous or otherwise polar environment.

A myriad of substrates having ion-exchange capacities can be used in the two embodiments. For example, zeolites, swellable clays, and alumino-silicate materials generally are suitable substrates. Petroleum refining catalyst is just one example of a suitable substrate. The weight percent of substrate in a system produced by the invented method ranges from between approximately 60 percent and 99 percent.

Ion-Exchange Substrate Detail

Figure 1:
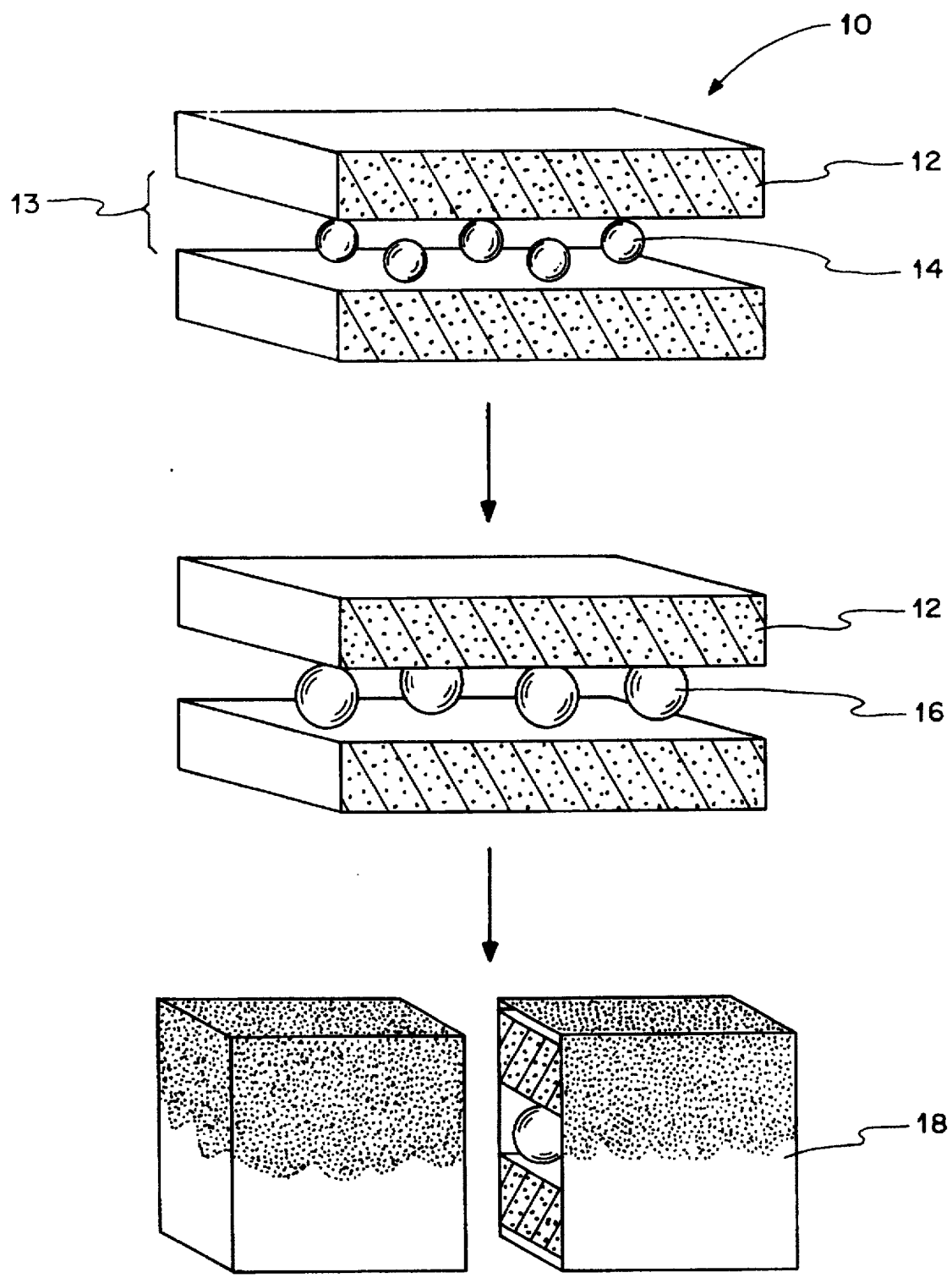
FIG. 1 is a diagram of various stages of untreated and treated clay, in accordance with the features of the present invention.

In the first embodiment of the invention, illustrated in FIG. 1 as numeral 10, substrates with ion-exchange capacities are used to receive and contain cations. While the inventors illustrate this first embodiment more thoroughly using clays, other substrates, such as the use of petroleum refining catalysts, are also suitable.

A myriad of clays can be utilized in this method, and generally, clays containing an interlayer to accommodate the injection of cations therein are most suitable. Clays such as smectite, montmorillonite, hectorite, bentonite and kaolin are good candidates. Smectite clays, for example, are formed by sheets of aluminosilicates 12 which are separated by an interlayer 13. This interlayer 13 naturally contains inorganic cations 14, such as calcium and potassium, and water molecules. These ions can be easily replaced by other cations through established ion-exchange processes. One such process used for clays is disclosed in Wasserman, Stephen R. et al, J. Amer. Chem. Soc. 1993 115 pp 3394–3395, and incorporated herein by reference. An exemplary laboratory scale ion-exchange process begins with the addition of 15 grams of air-dried clay to a 2 liter round bottom flask equipped with a magnetic stir bar. Approximately 1.5 liters of 0.1 molar copper (II) chloride (or of the desired cation) solution is added, the flask stoppered, and the entire solution stirred for approximately 24 hours at room temperature. The mixture is allowed to settle, and the solution is decanted from the flask. The clay is separated into four centrifuge tubes, and washed three times with 50 ml of water. The clay is allowed to air dry at room temperature for 24 hours.

Simple or complex cations 16 having charges ranging from +1 to +4 can be accommodated by the clay interlayers. Coulombic interaction between the cations and the alumino-silicate interlayers causes the cations to remain within the interlayer. Typical simple and complex cations of interest include, but are not limited to, nickel, lead, cadmium, copper, vanadium, antimony, the actinide elements generally, radioactive cations such as those of uranium, thorium, strontium, and complex cations such as uranyl.

Once the cations have been introduced into the clays, a subsequent step forms a hydrophobic coating 18 on the clay surface. This coating 18 is comprised of an alkyl silane compound having the general formula $RSi(OR')_3$, where R is an alkyl group and OR' is an alkoxy group or some other relatively charge-neutral moiety. Any alkyl group that results in a hydrophobic coating forming on the substrate surface is suitable. Generally, R groups containing from 1 to 40 carbons (either straight or branched, and which may include cyclic or aromatic structures) are appropriate. Alkyltrialkoxy silanes such as $CH_3(CH_2)_{17}Si(OCH_3)_3$, $CH_3(CH_2)_{17}Si(OC_2H_5)_3$, and $CH_3(CH_2)_{11}Si(OCH_3)_3$ produce good hydrophobic coatings on clays when the silanes are contacted to the clays in an acidic environment.

Generally, R' groups are chosen so that when these moieties interact with the substrate surface, charge-neutral species are generated. For example, in the instance where OR' is a methoxy group, charge-neutral methanol is generated and either complexes with metal ions without changing their charge, or else leaves the interlayers of the substrate. As such, there is no net reduction of the Coulombic interaction between the sheets of clay and the inserted metal ion. This is a salient feature of the invented method in as much as the inventors have found that an absence or significant diminution of the Coulombic interaction often results in the inserted metal ion exiting the interlayer and leaching from the substrate. Some leaching is observed from cation-injected clays, for example, when chlorosilanes, $RSi(Cl)_3$, are used in place of alkoxy silanes. As noted supra, water is needed to link adjacent silane molecules on the clay surface to construct a hydrophobic coating thereon. To assure that water, already contained in the clay, will be available to complex with the silyl species, the reaction outlined above is conducted in a nonpolar reaction environment. Several techniques can be employed to produce a nonpolar reaction environment. One suitable technique is using a neat solution of the silane material. In situations where long carbon lengths associated with the alkyl (R) moiety of the silane make that compound difficult to work with, nonpolar solvents which enhance the workability of the silane can be employed. Such nonpolar solvents such as hexane, heptane, naphtha, or other aromatic materials are suitable to dissolve the silyl material prior to contacting the material to the clay. Generally, only enough silane is needed to coat the material, typically approximately 5 percent by weight. When using octadecane alkyl groups, encapsulated clay substrates comprised of 25 percent organic material by weight of the clay are typical.

Given the relatively low reactivity of alkoxy substituted silanes compared to halogen-substituted silanes, a unique method to facilitate the nonaqueous deposition of the alkoxysilane material onto the substrate has been developed whereby an acid catalyst is used to initiate surface reaction. Any organic acids which are soluble in the reaction mixture and which do not produce an alternative complexing ligand are suitable catalysts. Two such acids are 3- indolepropionic acid and paratoluenesulfonic acid. Generally, anywhere from 0.001 to 0.25 weight percent of the acid catalyst to the clay is suitable.

A more specific protocol for generating hydrophobic clays containing injected cations follows. It should be noted that while the following protocol presents specific volumes and weights of reactants, a range of weight percents will produce final forms displaying good leach resistance. As such, the following specific volumes and weights of reactants should not be construed as limiting the invented encapsulation method.

Clay Protocol: In one experiment, 1.0 gram of dry, ion-exchanged clay was placed in a flask. Approximately 40 milliliters of anhydrous hexane solvent was added and the resulting mixture was stirred. This first mixing step can occur at temperatures ranging from between the freezing point and boiling point of the mixture.

To the above mixture was added 0.01 grams of the acid catalyst 3-indoproprionic acid. The resulting acid catalyst-spiked mixture is then placed in an anhydrous atmosphere to remove any water vapor from the system. One method for producing the anhydrous atmosphere is to purge the system with a stream of dry nitrogen gas. Dry air also can be used. Generally, a means for effecting an atmosphere having less than 10 percent humidity is suitable. After the establishment of the anhydrous atmosphere, the mixture is stirred for approximately 15 minutes.

After a nonpolar, acid-based reaction environment is established and has equilibrated, one ml of octadecyltrimethoxysilane is added to the flask via a means for maintaining the anhydrous reaction environment, such as a syringe.

After the addition of silane, the complete reaction liquor is stirred for a period ranging from between 0.1 to 24 hours. This stirring or mixing can occur at room temperature, and generally at ambient temperatures, given the obvious vapor pressure restrictions of the solvents used.

The resulting coated product is then washed with anhydrous hexane in amounts necessary to remove any unreacted silane. Three separate rinses with 50 ml of hexane achieved good results in the quantities discussed in this laboratory-scaled protocol. The washed solid is allowed to dry in air at room temperature.

While the final weight percent of the organic hydrophobic layer to the final product will depend on the length of the alkyl moiety attached to the original silane compound, generally, a weight percent of organic coating material to final encapsulated product selected from between approximately 1 and 40 percent is desirable.

Figure 2:
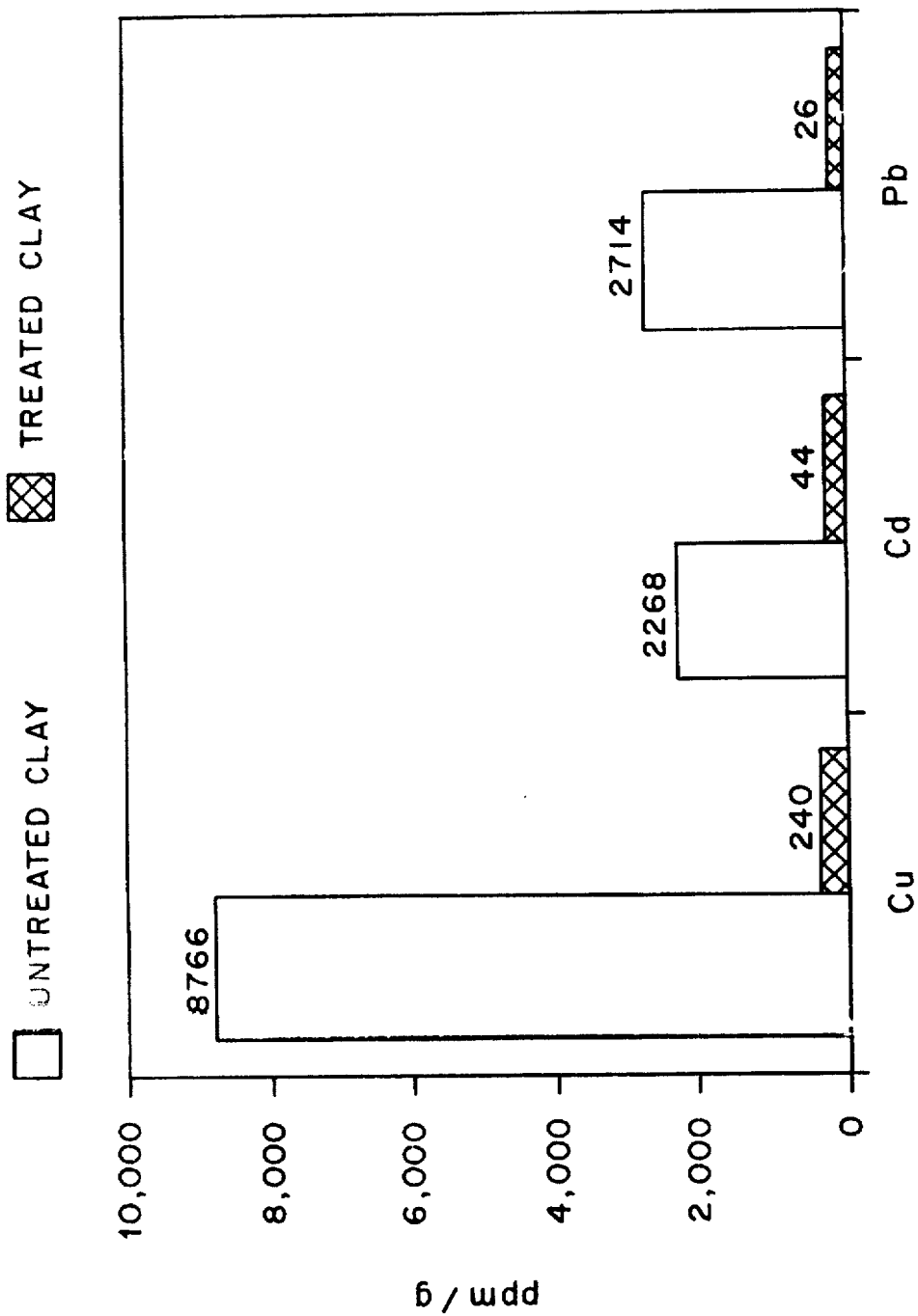
FIG. 2 is a graph showing the leachability data for various cations in untreated and treated clay, in accordance with the features of the present invention.

As the data depicted in FIG. 2 shows, the coated product displays superior leaching resiliency. For example, less than three percent of injected copper and cadmium ions leach out of clay treated by the invented method. For lead, less than one percent of injected lead ions leach from the encapsulated substrate. These results were obtained when 0.5 gram samples were emersed in 10 ml of Toxicity Characteristic Leaching Procedure fluid (pH 4.93, 0.05M sodium acetate/ acetic acid buffer) in a sonic cleaner for two hours. The solid was removed by filtration and the liquid was analyzed using Inductively Coupled Plasma-Atomic Emission Spectroscopy.

FCC Protocol: The process for the injection and stabilization of cations in petroleum refining catalysts generally follows the procedure outlined above for clay substrates. In one exemplary laboratory protocol, 2.0 grams of dry, Pb ion-exchanged spent FCC catalyst is mixed with 80 milliliters of anhydrous hexane and the resulting mixture is allowed to stir using a magnetic stir plate. Approximately 0.02 grams of 3-indolepropionic acid is added to the mixture. The system is then subjected to a means to produce a relatively dry atmosphere (10 percent humidity), such as a stream of dry nitrogen gas. The system is then sealed and the mixture stirred for 15 minutes. Approximately 2.0 milliliters of octadecyltrimethoxysilane is added via a syringe. The resulting mixture is allowed to stir for 24 hours at room temperature. The resulting product is then washed three times with 50 ml of anhydrous hexane or so much solvent to remove unreacted silane. The solid is allowed to air dry at room temperature for 12 hours.

Spent Petroleum Refining Catalyst Encapsulation Detail

The second embodiment of the invented method also utilizes silanes to stabilize cations, oxycations and metal oxides contained in spent fluid cracking catalysts (FCC). As with the treatment of clays, outlined supra, the silane treatment results in the formation of a hydrophobic, organic coating which restricts the diffusion of water through the cation-containing substrate.

In this second embodiment, the cations desired to be restricted include nickel and vanadium, which are originally found in crude oil that the catalysts help refine. A third cation of interest, antimony, is added to catalysts as a passivating agent during the cracking process to prevent accumulated nickel from over-cracking crude feedstock into unwanted light gases.

FCCs consist mainly of zeolite on an alumina silicate matrix with rare earth elements, such as cerium and lanthanum, added for stability, and transition metals added in a proprietary mix for catalytic activity. FCCs are widely available through W. R. Grace (Columbia, Md.), Akzo (Chicago, Ill.), and Englehardt, Inc. (Edison, N.J.), and other manufacturers.

In this second embodiment, treatment of the FCC begins initially with producing a silane coating on the surface of a spent catalyst which already contains hazardous metal cations.

A myriad of silane compounds can be utilized in the FCC-encapsulation method. As noted supra, the object of attaching alkyl substituted silanes onto the substrate surface is to effect a hydrophobic coating. Alkyl moieties containing at least one carbon (i.e. a methyl moiety), and as many as 20 carbons, all provide good hydrophobic characteristics. Generally, the silane compound has the formula $CnH2n+1SiX3$, wherein n is an integer and X is a halogen atom. Silane compounds having halogen atoms selected from the group consisting of chlorine, bromine, and iodine produce suitable coatings. Specific silane species that produce effective hydrophobic barriers include $CH3SiCl3$, $C2H5SiCl3$, $C12H25SiCl3$, and $C18H37SiCl3$.

Silane compounds containing an alkoxy moiety instead of a halogen moiety are also suitable for effecting coatings on spent FCC. Specific alkoxy substituted silanes which are suitable include $C18H37Si(OCH3)3$, $C18H37Si(OC2H5)3$, and $C12H25Si(OCH3)3$.

While the final weight percent of the organic hydrophobic layer to the final product will vary with the alkyl moiety length of the original silane compound, generally, for an octadecyl coating material a weight percent of organic to final encapsulated product selected from between 1 and 10 is desirable.

A specific protocol for encapsulating spent FCC materials follows. As with the clay encapsulation protocol disclosed above, this protocol is only meant to be illustrative in as much as the specific weight and volume percents disclosed for the various reactants are selected from a range of percents that will enable a practitioner skilled in the art to produce the desired coatings.

In a laboratory-scaled workup of the FCC encapsulation process, one gram of spent FCC is placed in a flask. To this is added 40 milliliters of organic solvent, such as anhydrous hexane or methylene chloride, and the resulting mixture is stirred or otherwise combined.

As in the clay encapsulation protocol, the mixture is then exposed to an anhydrous atmosphere. This anhydrous environment can be effected by a myriad of methods, including subjecting the reaction environment to dry air, dry nitrogen or any noble gases, such as helium, neon, or argon. Generally, a relative humidity level of less than approximately 10 percent is desired. The reaction environment is then sealed. In the laboratory, a rubber septum was used to seal the flask.

Approximately 1.0 ml of octadecyltrichlorosilane is added to the system via a means for maintaining the anhydrous reaction environment. Depending on the silane used, between approximately 10 weight percent and 20 weight percent of the silane to the FCC produces good final results. In this experimental protocol, a syringe was used to introduce the silane to the closed system.

When alkoxysilane material is used as a vehicle to building the hydrophobic coating, acid catalyst similar to those used in the clay encapsulation scenario, outlined supra, is added to initiate the FCC surface modification (coating) reaction. This is due to the relatively less reactive characteristics of the alkoxy moieties compared to the halogenated moieties. (However, this use of less reactive alkoxy containing silanes also obviates the need for maintaining a dry atmosphere during initial mixing.) In the laboratory protocol, 0.01 grams of 3-indolepropionic acid was used.

After the addition of silane, the complete reaction liquor is stirred for a period ranging from between 2 to 24 hours. This stirring or mixing can occur at room temperature, and generally at ambient temperatures.

The resulting coated product is then washed with anhydrous hexane in amounts necessary to remove any unreacted silane. Three separate rinses with 50 ml of hexane achieved good results in the quantities discussed in this laboratory-scaled protocol. The washed solid is allowed to dry in air at room temperature for approximately two hours.

A modification to the above protocol is to first steam-treat the spent FCC and then calcine the steam-treated FCC in an oven or kiln at between approximately 600° and 1,200° C. The inventors believe that this additional treatment collapses the crystalline structure of the FCC, and lowers the surface area of the catalyst, so as to provide yet another barrier to prevent the encapsulated cations from exiting the substrate. This steam-treatment and calcining process is also applicable in the first embodiment of the invention, disclosed supra, wherein petroleum refining catalyst substrates such as FCC are used as a container for a variety of cations which are first injected into the substrates.

Briefly, the spent FCC to be calcined is contacted to a mixture of steam or water vapor in air during the calcining process. The fraction of water in the vapor can range from between approximately 10 to 100 percent. The mixture is so treated for a period of between 0.1 and 8 hours, then allowed to cool. Excess water is removed from the FCC and the resulting pretreated substrate is then coated via the method disclosed above.

Figure 3:
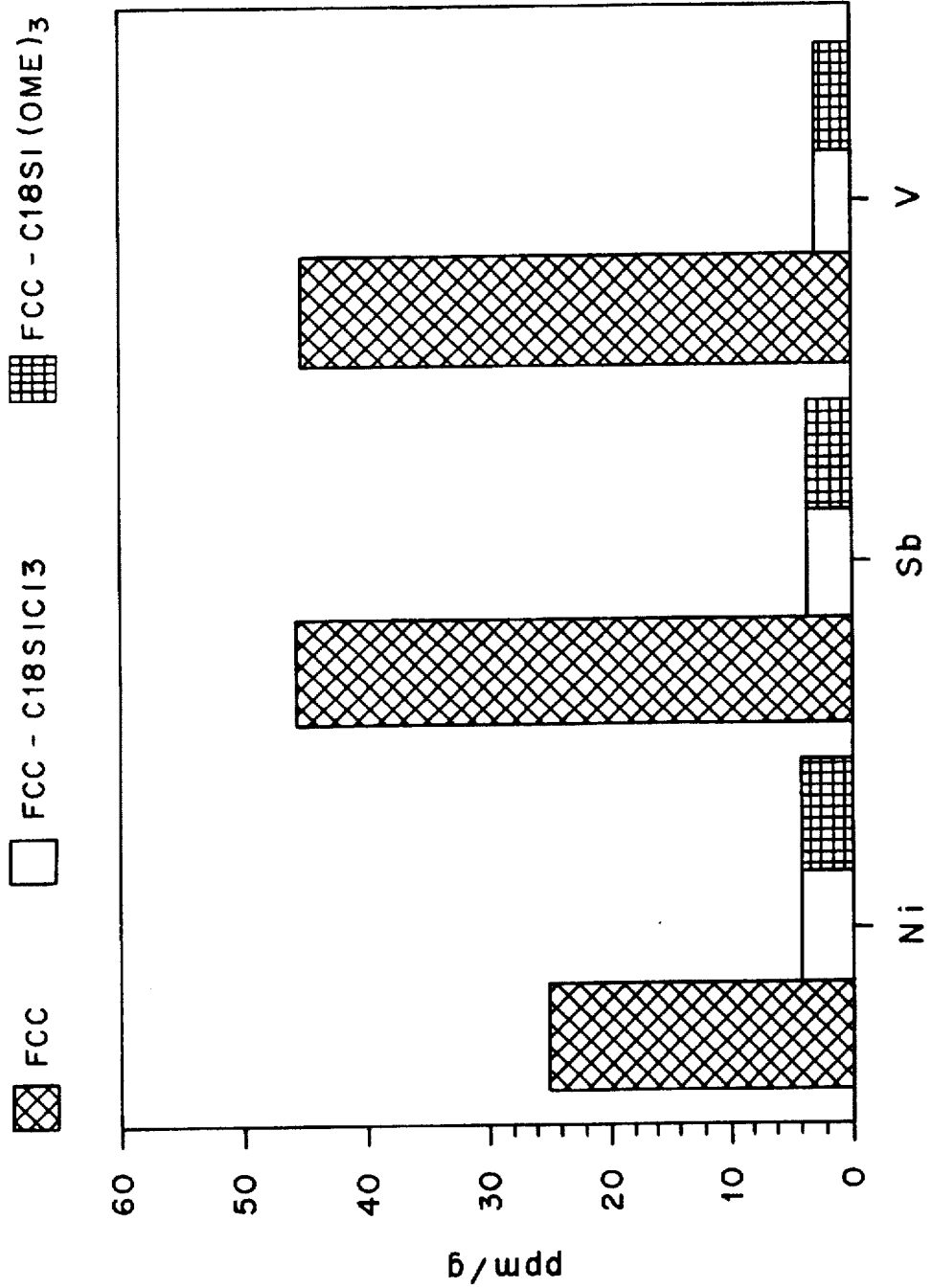
FIG. 3 is a graph depicting the leachability data for various cations in treated and untreated cracking catalyst, in accordance with the features of the present invention.

As can be noted in FIG. 3, the invented method for encapsulating FCC results in a 90 percent reduction of leachability of the above-noted heavy metals, compared to untreated, spent catalyst. Leachability of non-toxic metals such as calcium and iron is also reduced.

The data depicted in FIG. 3 is the result of encapsulated samples being immersed and sonicated in TCLP fluid for approximately 2 hours.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for encapsulating hazardous cations comprising a.) supplying a pretreated substrate containing the cations; and b.) contacting the substrate with a silane compound in a nonaqueous environment to form a coating on the substrate.

2. The method as recited in claim 1 wherein the substrate is pretreated with an ion exchange process to introduce the cations into the substrate.

3. The method as recited in claim 1 wherein the cation is a simple or complex cation having a charge from between +1 and +4.

4. The method as recited in claim 1 wherein the substrate has an ion-exchange capacity.

5. The method as recited in claim 1 wherein the substrate is selected from the group consisting of clay, zeolite, petroleum refining catalyst, and combinations thereof.

6. The method as recited in claim 5 wherein the silane compound is an alkyltrialkoxysilane having an alkyl group containing between approximately 1 and 24 carbons.

7. The method as recited in claim 5 wherein the petroleum refining catalyst is pretreated by a.) an ion-exchange process so as to result in cations being inserted into the catalyst; and b.) calcining the ion-exchanged catalyst.

8. The method as recited in claim 5 wherein the petroleum refining catalyst is contacted with a silane compound having the formula $CnH2n+1SiX3$, wherein X is a halogen.

9. The method as recited in claim 8 wherein the halogen is selected from the group consisting of chlorine, bromine and iodine.

10. The method as recited in claim 1 wherein the silane compound has a general formula $RSi(OR')_3$, where R is an alkyl group containing from 1 to 40 carbons and OR' is an alkoxy group containing from 1 to 10 carbons.

11. A method for preventing hazardous cations from leaching from solid petroleum refining materials comprising:

a.) supplying a catalyst that has been used in petroleum refining processes;

b.) pretreating said used fluid catalytic cracking catalyst; and c) contacting said pretreated fluid catalytic cracking catalyst with a silane compound so as to form a coating on the catalyst.

12. The method as recited in claim 11 wherein the step of pretreating the fluid catalytic cracking catalyst further comprises placing the catalyst in an anhydrous environment.

13. The method as recited in claim 12 wherein the silane compound is an alkyltrihalosilane.

14. The method as recited in claim 11 wherein the silane compound is an alkyltrialkoxysilane.

* * * * *